US012596981B1

(12) United States Patent
Dean et al.

(10) Patent No.: US 12,596,981 B1
(45) **Date of Patent: \*Apr. 7, 2026**

(54) PRE-DATA BREACH MONITORING

(71) Applicant: ConsumerInfo.com, Inc., Costa Mesa, CA (US)

(72) Inventors: Michael John Dean, Torrance, CA (US); Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,012

(22) Filed: Jul. 2, 2024

Related U.S. Application Data

(63) Continuation of application No. 18/148,073, filed on Dec. 29, 2022, now Pat. No. 12,045,755, which is a (Continued)

(51) Int. Cl.

| | |
|---|---|
| *G06Q 40/00* | (2023.01) |
| *G06F 16/958* | (2019.01) |
| *G06F 21/60* | (2013.01) |
| *G06Q 10/0635* | (2023.01) |
| *G06Q 10/105* | (2023.01) |
| *G06Q 30/0204* | (2023.01) |

(Continued)

(52) U.S. Cl.
CPC ....... *G06Q 10/0635* (2013.01); *G06F 16/958* (2019.01); *G06F 21/604* (2013.01); *G06Q 10/105* (2013.01); *G06Q 30/0205* (2013.01); *G06Q 50/01* (2013.01); *G06Q 50/265* (2013.01)

(58) Field of Classification Search
CPC ............ G06Q 10/0635; G06Q 10/105; G06Q 30/0205; G06Q 50/01; G06Q 50/265; G06F 16/958; G06F 21/604
See application file for complete search history.

(56) References Cited

U.S. PATENT DOCUMENTS

| | | | | |
|---|---|---|---|---|
| 7,433,864 | B2 * | 10/2008 | Malik | .................. G06F 16/951 |
| 8,473,415 | B2 * | 6/2013 | Siegel | ............... G06Q 20/4016 |
| | | | | 705/38 |

(Continued)

FOREIGN PATENT DOCUMENTS

| | | |
|---|---|---|
| AU | 2011203185 | 7/2011 |
| AU | 2021215125 | 9/2021 |

(Continued)

OTHER PUBLICATIONS

Security Risk Management in Online System; Computational Science/ Intelligence and Applied Informatics/2nd Intl Conf on Big Data, Cloud Computing, Data Science (ACIT-CSII-BCD) (pp. 119-124); Arwa K. AlSalamah; Jul. 9, 2017. (Year: 2017).*

(Continued)

*Primary Examiner* — Tien C Nguyen
(74) *Attorney, Agent, or Firm* — Knobbe, Martens, Olson & Bear, LLP

(57) ABSTRACT

A method for providing pre-data breach monitoring provides information to businesses that is useful to predict portions of the company data that may not be secured well enough and other risks associated with data breaches, such as employees that may not be trustworthy.

20 Claims, 12 Drawing Sheets

Related U.S. Application Data continuation of application No. 17/313,775, filed on May 6, 2021, now Pat. No. 11,568,348, which is a continuation of application No. 16/657,057, filed on Oct. 18, 2019, now Pat. No. 11,030,562, which is a continuation of application No. 13/665,636, filed on Oct. 31, 2012, now abandoned.

(60) Provisional application No. 61/553,761, filed on Oct. 31, 2011.

(51) Int. Cl.
*G06Q 50/00* (2012.01)
*G06Q 50/26* (2012.01)

(56) References Cited

U.S. PATENT DOCUMENTS

| | | | | |
|---|---|---|---|---|
| 8,607,353 | B2 * | 12/2013 | Rippert, Jr. | G06Q 10/10 709/225 |
| 8,676,699 | B2 * | 3/2014 | Philips | G06Q 40/03 705/36 R |
| 8,850,539 | B2 * | 9/2014 | Bailey, Jr. | H04L 63/10 726/7 |
| 8,949,981 | B1 * | 2/2015 | Trollope | G06Q 50/01 709/224 |
| 11,941,635 | B1 | 3/2024 | Coleman et al. | |
| 12,045,755 | B1 | 7/2024 | Dean et al. | |
| 12,099,940 | B1 | 9/2024 | Chen et al. | |
| 2005/0278786 | A1 * | 12/2005 | Tippett | H04L 63/1416 726/25 |
| 2006/0020814 | A1 * | 1/2006 | Lieblich | G06F 21/577 713/182 |
| 2008/0103800 | A1 * | 5/2008 | Domenikos | G06Q 40/02 705/318 |
| 2009/0292568 | A1 | 11/2009 | Khosravani et al. | |
| 2010/0188684 | A1 * | 7/2010 | Kumara | G06F 21/608 358/1.14 |
| 2010/0250509 | A1 * | 9/2010 | Andersen | G06Q 10/10 709/217 |
| 2010/0281248 | A1 | 11/2010 | Lockhart et al. | |
| 2010/0293090 | A1 * | 11/2010 | Domenikos | G06Q 10/04 705/325 |
| 2011/0131123 | A1 * | 6/2011 | Griffin | G06Q 40/08 705/35 |
| 2012/0198556 | A1 * | 8/2012 | Patel | G06F 21/577 726/25 |
| 2013/0132060 | A1 * | 5/2013 | Badhe | G06F 16/355 703/22 |
| 2014/0143134 | A1 | 5/2014 | Yan | |
| 2014/0180883 | A1 | 6/2014 | Regan | |
| 2015/0033297 | A1 | 1/2015 | Sanso et al. | |
| 2016/0063634 | A1 | 3/2016 | Calibey | |
| 2016/0125412 | A1 | 5/2016 | Cannon | |
| 2017/0161520 | A1 | 6/2017 | Lockhart, III | |
| 2017/0161746 | A1 | 6/2017 | Cook | |
| 2017/0331839 | A1 | 11/2017 | Park et al. | |
| 2018/0027001 | A1 | 1/2018 | Park et al. | |
| 2018/0131708 | A1 | 5/2018 | Pirttilahti et al. | |
| 2018/0218369 | A1 | 8/2018 | Xiao et al. | |
| 2019/0354982 | A1 | 11/2019 | Gómez | |
| 2019/0385170 | A1 | 12/2019 | Arrabothu et al. | |
| 2020/0005310 | A1 | 1/2020 | Kumar et al. | |
| 2020/0110870 | A1 | 4/2020 | Girdhar | |
| 2021/0150056 | A1 | 5/2021 | Vax | |
| 2021/0182857 | A1 | 6/2021 | Tiwan | |
| 2022/0180368 | A1 | 6/2022 | Immaneni | |
| 2023/0008975 | A1 | 1/2023 | Crudele | |
| 2023/0283628 | A1 | 9/2023 | Johnston | |
| 2023/0342605 | A1 | 10/2023 | Sankaran et al. | |
| 2023/0362014 | A1 | 11/2023 | Knopf | |
| 2023/0388131 | A1 | 11/2023 | Knopf | |
| 2023/0403276 | A1 | 12/2023 | Vbh et al. | |

FOREIGN PATENT DOCUMENTS

| | | |
|---|---|---|
| EP | 3 092 569 | 1/2024 |
| WO | WO 2008/028179 | 3/2008 |
| WO | WO 2018/163162 | 9/2018 |
| WO | WO 2019/018420 | 1/2019 |
| WO | WO 2022/261600 | 12/2022 |

OTHER PUBLICATIONS

Exploring User Behavior and Cybersecurity Knowledge—An experimental study in Online Shopping; 2018 16th Annual Conference on Privacy, Security and Trust (PST) (pp. 1-10); Ghada El Haddad, Amin Shahab, Esma Aimeur; Aug. 28, 2018. (Year: 2018).*
International Preliminary Report on Patentability in Application No. PCT/US2022/024277, dated Oct. 26, 2023.
Al-Zaben et al., "General Data Protection Regulation Complied Blockchain Architecture for Personally Identifiable Information Management," 2018 International Conference on Computing, Electronics & Communications Engineering (iCCECE), Southend, UK, 2018, pp. 77-82.
Chatzigeorgiou et al., "A Communication Gateway Architecture for Ensuring Privacy and Confidentiality in Incident Reporting," 2017 IEEE 15th International Conference on Software Engineering Research, Management and Applications (SERA), London, UK, 2017, pp. 407-411.
Chen et al., "Statistical Analysis of Identity Risk of Exposure and Cost Using the Ecosystem of Identity Attributes," 2019 European Intelligence and Security Informatics Conference (EISIC), Oulu, Finland, 2019, pp. 32-39.
Crane et al., "A Customizable Reputation-based Privacy Assurance System using Active Feedback," 2006 Securecomm and Workshops, Baltimore, MD, USA, 2006, pp. 1-8.
Li, "Threats and data trading detection methods in the dark web," 2021 6th International Conference on Innovative Technology in Intelligent System and Industrial Applications (CITISIA), Sydney, Australia, 2021, pp. 1-9.
Peterson et al., "Introduction to Identity Management Risk Metrics," in IEEE Security & Privacy, vol. 4, No. 4, Jul.-Aug. 2006, pp. 88-91.
Sakapertana et al., "Improving Rest API Security and Software Integrity through Automated PII Detection Tool Using Machine Learning Techniques," 2025(ICoCSETI), Jakarta, Indonesia, 2025, pp. 404-409.
Sherly et al., "BOAT Adaptive Credit Card Fraud Detection System", 2010 IEEE International Conference on Computational Intelligence and Computing Research, Dec. 2010, p. 7.
Silva et al., "Privacy in the Cloud: A Survey of Existing Solutions and Research Challenges," in IEEE Access, vol. 9, 2021, pp. 10473-10497.
Trabelsi, "Monitoring Leaked Confidential Data," 2019 10th IFIP International Conference on New Technologies, Mobility and Security (NTMS), Canary Islands, Spain, 2019, pp. 1-5.
Xu et al., "Research on Dark Web Monitoring Crawler Based on TOR," 2021 IEEE 2nd International Conference on Information Technology, Big Data and Artificial Intelligence (ICIBA), Chongqing, China, 2021, pp. 197-202.

* cited by examiner

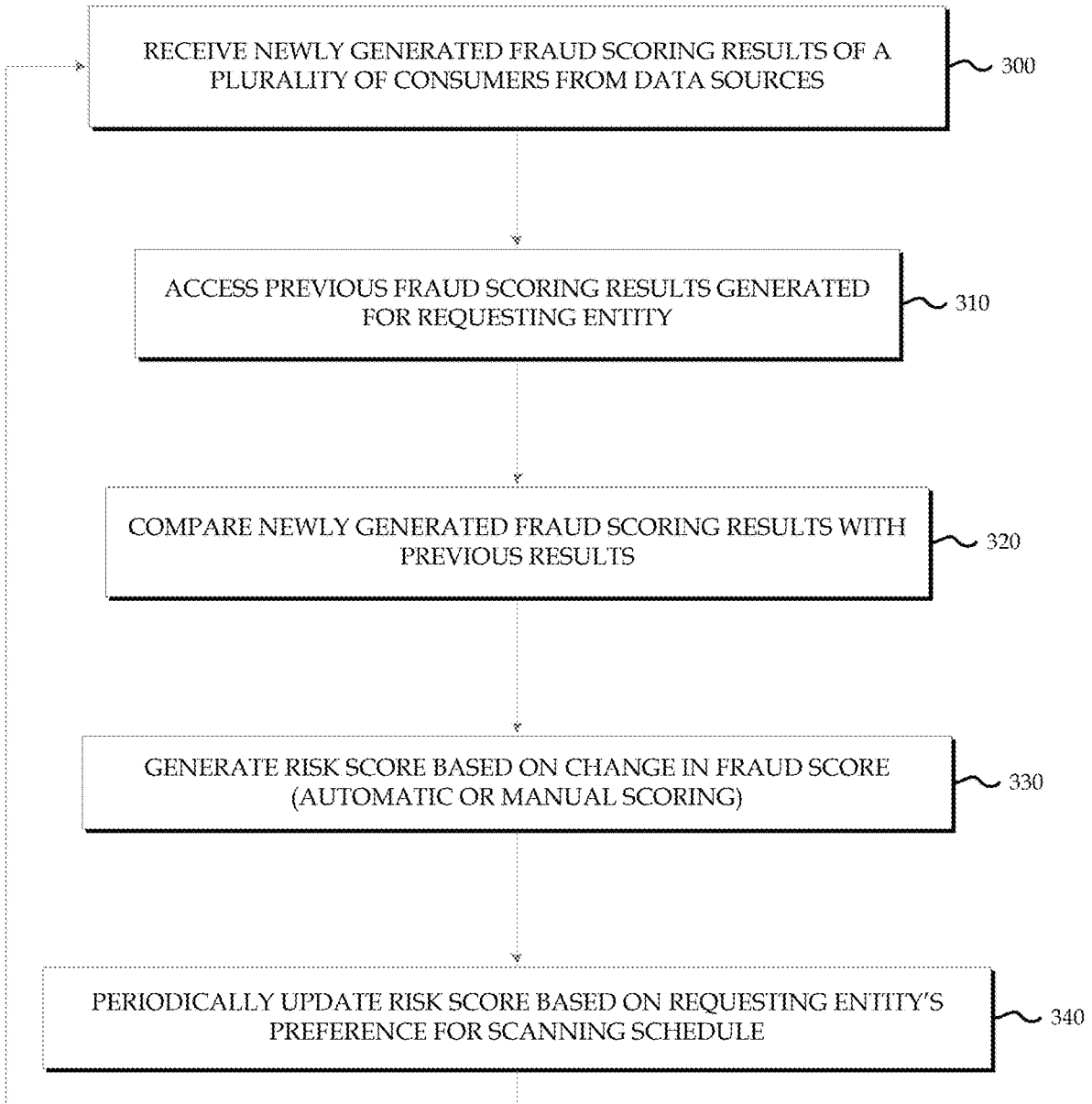

RECEIVE NEWLY GENERATED FRAUD SCORING RESULTS OF A PLURALITY OF CONSUMERS FROM DATA SOURCES — 300

ACCESS PREVIOUS FRAUD SCORING RESULTS GENERATED FOR REQUESTING ENTITY — 310

COMPARE NEWLY GENERATED FRAUD SCORING RESULTS WITH PREVIOUS RESULTS — 320

GENERATE RISK SCORE BASED ON CHANGE IN FRAUD SCORE (AUTOMATIC OR MANUAL SCORING) — 330

PERIODICALLY UPDATE RISK SCORE BASED ON REQUESTING ENTITY'S PREFERENCE FOR SCANNING SCHEDULE — 340

FIGURE 3

PRE-DATA BREACH MONITORING

CROSS-REFERENCE TO RELATED APPLICATIONS

This application is a continuation of U.S. application Ser. No. 18/148,073, filed Dec. 29, 2022, which is a continuation of U.S. application Ser. No. 17/313,775, filed May 6, 2021, which is a continuation of U.S. application Ser. No. 16/657, 057, filed Oct. 18, 2019, which is a continuation of U.S. application Ser. No. 13/665,636, filed Oct. 31, 2012, which claims the benefit of U.S. Provisional Application No. 61/553,761, filed on Oct. 31, 2011, the disclosures of which are hereby incorporated by reference in their entirety.

BACKGROUND

With consumers providing personal information more frequently to online websites and services, data breaches of that personal data held by companies are becoming more frequent. In general, a data breach occurs when personal information of customers is compromised. For example, a fraudster may hack into a customer database in order to access personal information of the customers, such as name, address, contact information, credit card or other billing information, secret questions and answers, social security number, etc.

SUMMARY

In the event of a data breach, the breached company can perform remediation processes, but it would be advantageous for the company to prevent the breach from occurring, or at least identify the breach as soon as possible so such remediation processes can be performed before extensive damage to the identity of the company's customers has occurred.

Disclosed herein are systems and methods for pre-breach data monitoring that may be used to detect possible breaches of personal information, such as information of customers and/or employees of a company. For example, a pre-breach monitoring system may provide information to a requesting entity (e.g., a business) that is useful to predict portions of the company data (e.g., employee and/or customer information) that may not be secured well enough and other risks associated with data breaches, such as employees that may not be trustworthy.

Described herein, among other things, are systems and methods for enabling a requesting entity to request that a pre-breach system monitors one or more data sources in order to identify information associated with consumers affiliated with the requesting entity (e.g., customers and/or employees), and to then generate one or more data breach risk score that are usable to predict portions of the requesting entity's data that may not be secured well enough. In one embodiment, the requesting entity provides the pre-breach system with a file including identification information of a plurality of consumers (e.g., employees and/or customers of the requesting entity) and requests a comparative scan from a plurality of data sources. One or more breach risk scores may be generated based on the results from the comparative scan. The risk scores may then be provided to the requesting entity.

In one embodiment, a method of monitoring online data to predict or determine a risk of data breach associated with customers and/or employees of a requesting entity comprises receiving a scan list comprising information regarding a plurality of individuals associated with a requesting entity, periodically scanning a plurality of data sources for information regarding the individual on the scan list, identifying, for each of a plurality of data breach risk categories, a quantity of located data regarding the individuals, for each of the plurality of data breach risk categories, determining a difference between the quantity of located data and a quantity of located data identified in one or more previous scans of the plurality of data sources, and based on at least the determined differences for respective data breach risk categories, providing the requesting entity with an assessment of potential or actual data breach, wherein the assessment is usable to determine a likelihood of whether the requesting entity's data has been breached.

In one embodiment, the assessment of potential or actual data breaches includes a risk score for each of the data breach risk categories based on at least the determined difference for respective data breach risk categories. An overall risk score may be based on risk scores for each of the data breach risk categories. The overall risk score may be an average of the risk scores for each of the data breach risk categories. A first of the risk scores may be weighted more heavily in determining the overall risk score than a second of the risk scores.

In one embodiment, the plurality of data breach risk categories includes one or more of public internet, dark web, social media, sex offender, healthcare, or fraud risk. Public internet data sources may include any sites that are available via a typical browser, such as sites that are locatable by typing in a URL or locatable by an internet search engine (e.g., Google). Dark web data sources may include sites or other information on network hosts that are not widely accessible on the Internet, and may also be referred to as dark address space. Such dark web sites may have domains (e.g., onion) that are only accessible with particular software or browsers (e.g., Tor). Because of the way some of these dark web browsers and hosts are configures, both the host serving out web pages and the requesting client may be obscured and not easily identifiable. Social media data sources may include any number of sites wherein users can share information, comments, interests, photographs, etc., either on a personal or professions level. Examples of currently available social media sites include Facebook, Twitter, Linkedin, Pinterest, and countless others. Sex offender data sources may include government operated databases and/or private database that may include information from one or more governments and/or information obtained from other sources. Healthcare data sources include any data regarding health information of individuals, including HIPAA (Health Insurance Portability and Accountability Act) and non-HIPAA information. Healthcare data sources may include insurance sites, patient health records sites, health care provider sites, government healthcare sites, and/or any other data sources that may include information regarding health of individuals. In some embodiments, certain data sources may be associated with multiple risk categories. For example, a social media site may also include healthcare information and, thus, may be associated with both a social media and a healthcare category. Fraud risk data sources may include sites and/or services that provide information regarding risk of fraud associated with an individual. For example, a third party service may lookup information associated with an individual and provide back a fraud risk score (or simply "fraud score") that indicates a likelihood that the person really is who they say they are and/or a risk of fraud being perpetrated by the individual.

In one embodiment, the periodic scanning is performed on a frequency determined by the requesting entity. The generated scores may indicate respective percentage changes between the quantity of located data and a quantity of located data identified in one or more previous scans of the plurality of data sources. The method may further comprises providing indications of one or more measures taken to improve the risks identified. The measures taken to improve the risks identified by one requesting entity may be compared with the measures taken by other businesses or requesting entities. The measures taken to improve the risks identified may be monitored periodically and correspond to a badge associated with the requesting entity.

In one embodiment, in response to determining that the assessment of potential or actual data breach is acceptable, the requesting entity is provided the ability to place a badge on information provided by the requesting entity, the badge indicating that the requesting entity has taken measures to reduce risks of data breach. The badge may be selected from a plurality of badges, wherein respective badges indicate various levels of measures taken to reduce risks of data breach and/or a current level of risk of data breach.

BRIEF DESCRIPTION OF THE DRAWINGS

FIG. 3 is a flowchart illustrating one embodiment of a method for periodically monitoring and comparing fraud scores.

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

The embodiments disclosed herein describe systems and methods for pre-data breach monitoring. A requesting entity, such as a business, may request generation of a one or more breach risk scores through a pre-data breach monitoring system (also referred to as "pre-breach system") to predict portions of the requesting entity's data that may not be secured well enough and other risks associated with data breaches. One or more breach risk scores may be generated by comparing data provided by the requesting entity including identification information of a plurality of individual associated with the requesting entity, such as its customers or employees. The breach risk scores may be based on information from one or more data sources, which may be placed into risk categories. For example, data breach risk categories (or simply "risk categories) may include public internet, the Dark Web, social media sites, sex offender databases, heath care, fraudulent activity sites, or fraud risk score. Each of the risk categories may be associated with one or more data sources, such as website, databases, servers, or other data sources. Thus, information for a particular risk category may be retrieved from a plurality of data sources.

In one embodiment, a requesting entity, such as a business, may request generation of one or more data breach risk scores associated with respective risk categories. In one embodiment, such data breach risk scores may be calculated periodically, e.g. monthly, in order to periodically update risks associated with each of the data breach categories.

Figure 1:
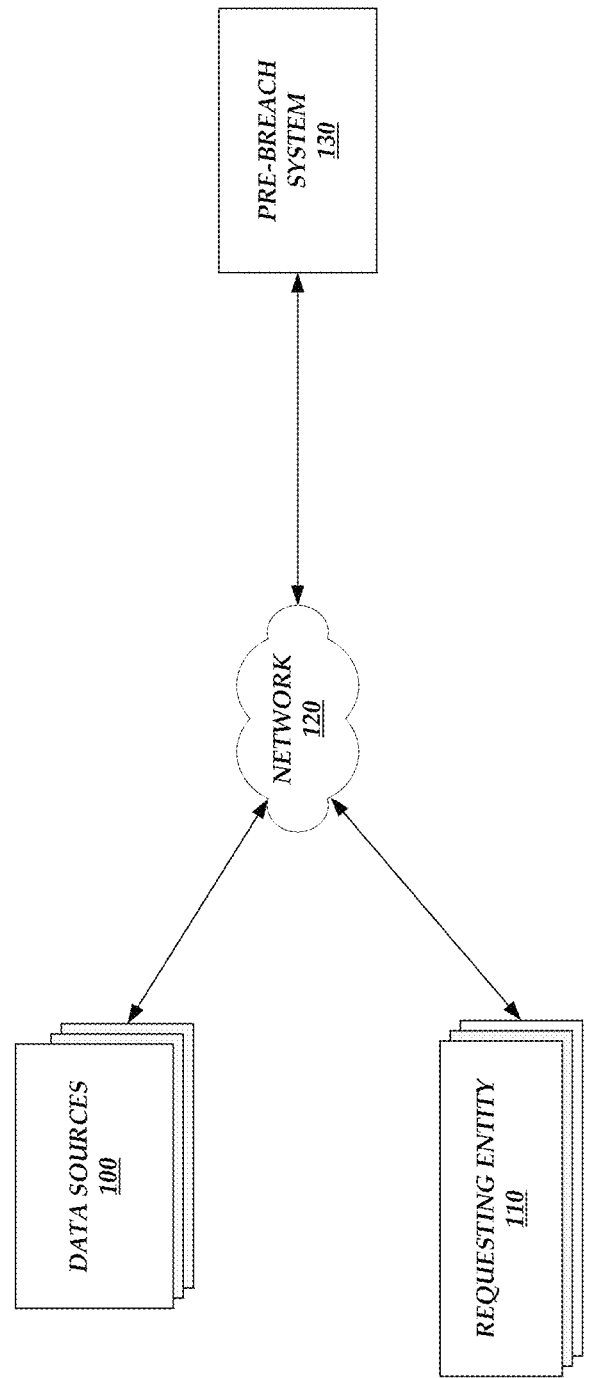
FIG. 1 is a block diagram illustrating one embodiment of a pre-data breach monitoring device in communication with data sources and a requesting entity.
Figure 11:
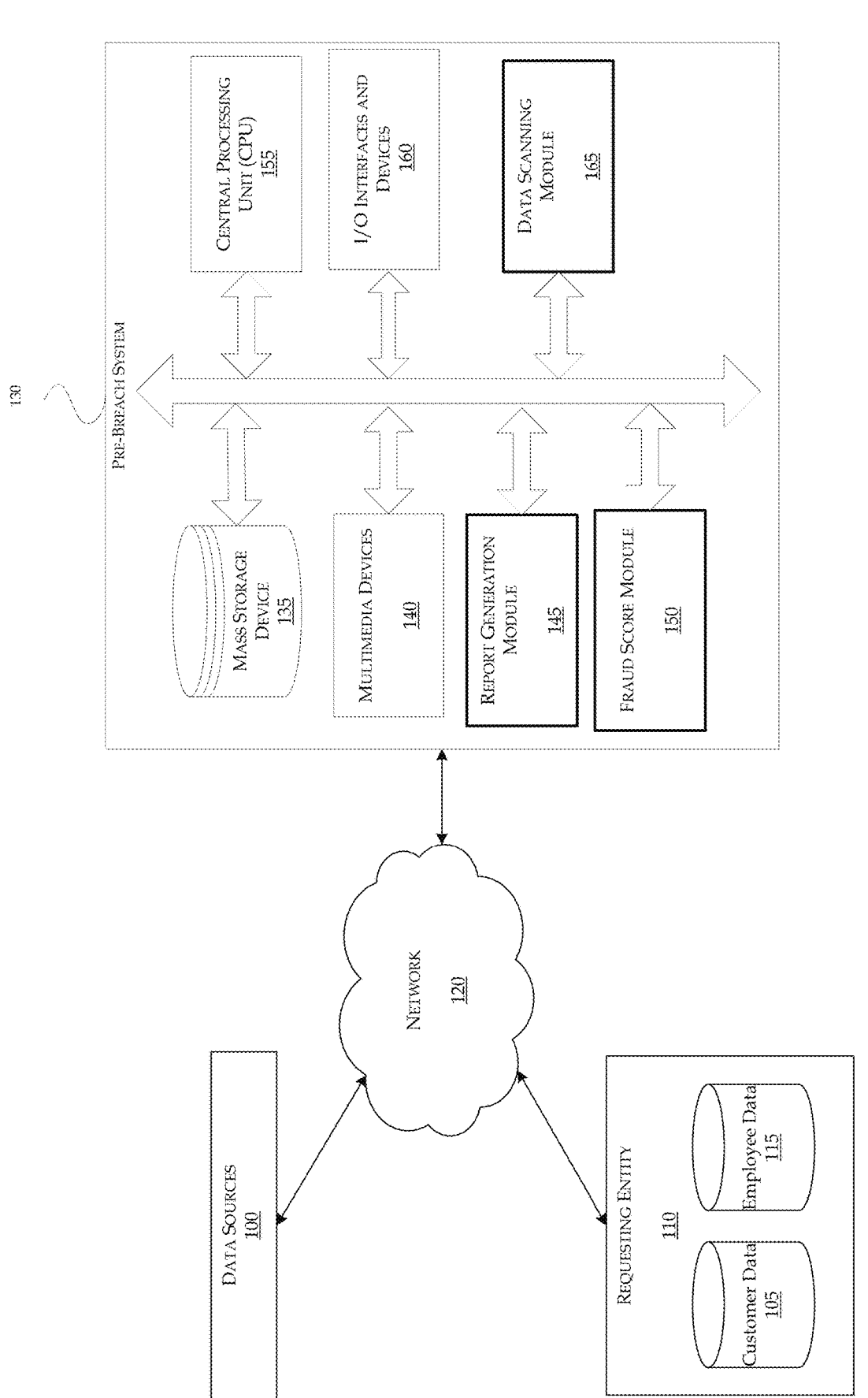
FIG. 11 is a block diagram depicting one embodiment of the pre-data breach monitoring system in communication with a network and various systems which are also in communication with the network.

In one embodiment, changes in risk scores over a period of time may result in the requesting entity being rewarded a badge that reflects the positive improvement. For example, if a requesting entity has an overall risk score (e.g., based on multiple risk scores for respective risk categories) that has decreased by a certain percentage from a previous overall risk score (e.g., from a previous month), the requesting entity may be provided an opportunity to place a badge on the company's website, for example, to serve as an indication that the company is proactive in monitoring how its customers and/or employees data is used. Depending on the embodiment, different levels of badges may be provided to a requesting entity that are indicative of different measures taken by the requesting entity in monitoring for, remediating, and/or preventing breach of company data. In some embodiments, badges may be revoked or downgraded if the requesting entity fails to maintain a suitable level of risk (e.g., one or more risk scores must be maintained above threshold levels) in one or more data breach risk categories. Example System Implementation FIG. 1 is a block diagram showing an example configuration of a pre-data breach monitoring system 130 (or "pre-breach system 130") in communication with a requesting entity 110 and data sources 100. In this embodiment, a requesting entity 110 communicates with the pre-breach system 130 with a request for the pre-breach system 130 to predict portions of the requesting entity's data that may not be secured well enough and/or other risks associated with data breaches. In this embodiment, the requesting entity 110 represents any entity that collects identification information on its customers, employees, or any consumers. Thus the requesting entity 110 may be a business, non-profit organization, government organization, other group, or even an individual consumer. FIG. 11, discussed below, further illustrates example components and operations of the pre-breach system 130.

In one embodiment, the requesting entity 110 requests data breach risk scoring from the pre-breach system 130. In one embodiment, the requesting entity 110 provides the pre-breach system 130 with a scan list comprising one or more data structures including identification information of a plurality of its consumers (or employees) so that the pre-breach system 130 can identify potential misuses of those consumers' information. The pre-breach system 130 may perform (or initiate performance by one or more other computing systems) a scan of one or more data sources 100 for identification information on these respective consumers. The consumer information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. In one embodiment, the pre-breach system 130 may access and/or download information from multiple data sources and then compare the consumer information from the requesting entity with the accessed information in order to identify any matches. Once such comparisons are performed, the pre-breach system 130 may generate one or more data breach risk scores indicative of data breach risks in respective risk categories. The results may then be provided to the requesting entity 110 in various manners.

In one embodiment, the data sources 100 represent any online, offline, and/or other data sources and/or an entity that scans the various online, offline, and/or other data sources. Depending on the embodiment, data from any number of data sources 100 may be accessed by the pre-breach system 100, whether the pre-breach system 130 scans the data sources itself or receives the information (or summaries of the information) from certain data sources from a third-party entity that perform such scans. For example, a first data source may comprise the public internet, while a second data source may comprise the Dark Web. Other data sources may include data from social networks, sex offender databases, health care databases, fraud risk scoring systems, or any other type of data source that may contain consumer information.

In one embodiment, the data breach risk scores generated by the pre-breach system 130 are based on comparisons of data regarding individuals on the requesting entity's scan list with data regarding the same individuals from one or more previous scans. For example, the pre-breach system 130 may compare a quantity of matches of personal information for a particular requesting entity from a particular data source to the corresponding quantity of matches located in a previous scan in order to determine a risk score for a particular risk category. For example, if a scan list of 1,000 customers results in 50 matches of customer information located on social media sites, but in a previous scan only 40 matches of customer information were identified on social media sites, a risk score for the social media risk category may be calculated based on a comparison of the 40 matches to the 50 matches. For example, a percentage increase/decrease may be included in a data breach risk score.

In one embodiment, the assessment of potential or actual data breaches is performed at least partially manually. In other embodiments, the assessment of potential or actual data breaches is performed at least partially automatically by a computing device.

In one embodiment, the requesting entity 110 can request periodic scanning of customized data breach categories. For example, a requesting entity 110 may choose to have the pre-breach system 130 monitor and scan the public internet and the Dark Web for its consumers' information every month. Based on this periodic scanning, the requesting entity 110 can determine an increase or decrease in actual or potential data breach risks over a period (such as risk associated with respective risk categories, as well as an overall risk score that may be based on multiple category risk scores). Similarly, another requesting entity may request that the pre-breach system 130 scans additional data sources, possibly on a different frequency. Additionally, a requesting entity may establish rules for frequency of scanning different data sources such that data sources associated with a first risk category are scanned at a first frequency (e.g., weekly), while one or more data sources associated with a second risk category are scanned at a second frequency (e.g., quarterly).

In one embodiment, the data breach risk scores generated by the pre-breach system 130 over a period can be assessed and a percentage change may be calculated based on the increase or decrease in respective data breach risk scores. These percentage changes may correspond with a badge that may be awarded to a requesting entity 110 that has met certain requirements in addressing its data breach risks. Depending on the embodiment, this badge may be removed if the requesting entity fails to take continued action to address data breach risks identified.

Example Methods

Figure 2:
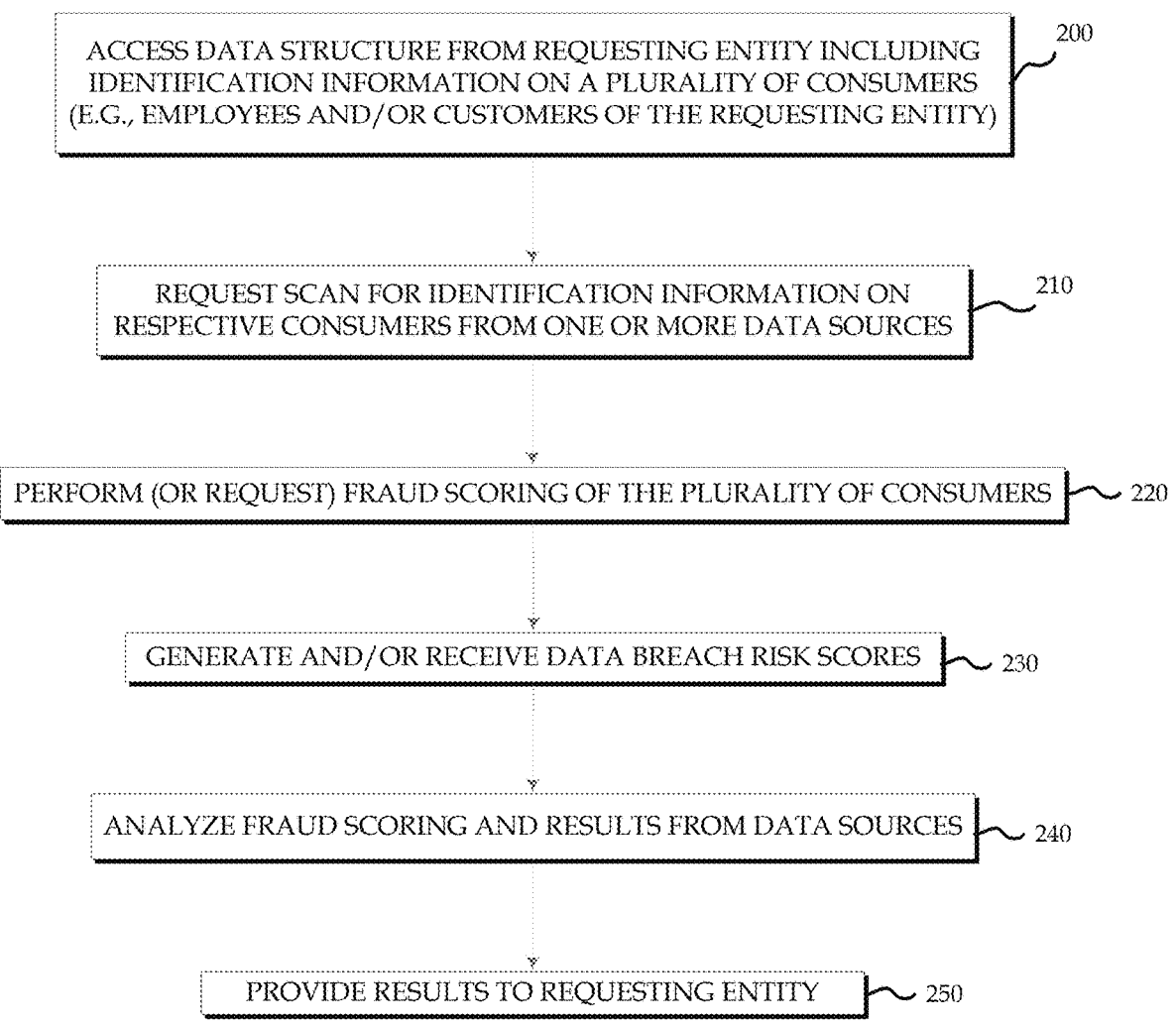
FIG. 2 is a flowchart illustrating one embodiment of a method for performing fraud scoring and providing the results to a requesting entity.

FIG. 2 is a flowchart illustrating one embodiment of a method of providing data breach risk assessments. In an embodiment, the method shown in FIG. 2 may be performed substantially in real time so that the requesting entity 110 is presented with data breach risk scores and/or detailed reports containing information related to actual or potential data breaches without substantial delay. Alternatively, the method of FIG. 2 may be performed as part of a scheduled batch process, such as a pre-breach scanning process that may be performed on a requesting entities customer and/or employees on a periodic basis. Depending on the embodiment, the method may be performed with fewer or additional blocks than are illustrated in FIG. 2. In one embodiment, the method of FIG. 2 is performed by the pre-breach system 130. However, the method may be performed by one or more other suitable computing systems, such as a computing system that includes data scanning and data breach risk scoring modules that perform similar features to those discussed with reference to the pre-breach system 130. For ease of discussion, the methods discussed below will be described with reference to the pre-breach system 130. However, the methods may be performed by any other suitable computing system.

At block 200, the pre-breach system 130 accesses a scan list from the requesting entity 110 that includes one or more data structures having identification information on a plurality of consumers (e.g., employees and/or customers of the requesting entity). Such information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. In some embodiments, the information can be accessed through one or more user interfaces provided to the requesting entity 110. Alternatively, the information may be accessed in other manners, such as via a batch process wherein a data structure including information regarding a plurality of consumers is transmitted by the requesting entity to the pre-breach system 130, such as daily, weekly, or monthly. The information may be included in any available file format, such as a database, spreadsheet, or markup language format.

At block 210, the pre-breach system 130 requests a scan for identification information on respective consumers and/or employees from one or more data sources 100. Depending on the embodiment, data may be requested by the pre-breach system 130 from any number of public or private data sources 100. For example, data sources 100 may be in various risk categories, such as public internet, the Dark Web, social networks, sex offender databases, health care databases, fraud risk scoring systems, or any other type of data that may include consumer information.

In some embodiments the pre-breach system 130 requests data from other entities, such as social networking and sex offender database scanning entities, in addition to (or replacement to) scanning of certain data sources, e.g., the public internet, that may be performed by the pre-breach system 130. In one embodiment, the pre-breach system 130 scans one or more data sources 100 for information regarding individuals on the scan list from the requesting entity 110 in order to identify indications of potential data breaches of the requesting entity's data 110.

At block 220, the pre-breach system 130 performs or requests fraud risk scoring of the plurality of consumers. The fraud risk score may be generated based on customer or employee information provided by the requesting entity 110. For example, the customer information may be provided to a fraud score provider and, in return, the pre-breach system 130 may receive fraud scores for respective individuals. In one embodiment, fraud risk scores (or simply "fraud scores") may be provided by Experian's Precise ID and/or other fraud risk analysis systems.

At block 230, the pre-breach system 130 generates and/or receives data breach risk score, such as for respective data breach risk categories. Depending on the embodiment, fewer and/or additional data breach categories than note above may be used.

Depending on the embodiment, the data breach risk scores may be based on a quantity of information located in the scan associated with individuals on the scan list and/or on one or more analytical models that analyze the information associated with the individuals that was located. For example, the type of information located at a particular data sources may affect how heavily weighted the information is in determined one or more risk scores for respective risk categories. For example, if only a last name and first name of multiple consumers are located within data source associated with a public internet risk category, such information may have little or no effect on a the risk score for that category. However, if more sensitive information of consumers is identified, such as Social Security number, driver's license number, etc., such information may have a larger effect on a breach risk score for the risk category. In some embodiments, scanning of the data from one or more data sources includes looking for information that is unique (or substantially unique) to the requesting entity. Location of such unique information, such as account numbers, may be a strong indicator that the consumer information located with that unique information was leaked from the particular requesting entity. Thus, location of information that is unique to a particular requesting entity may result in a large effect (or weighting) on a data breach risk score for the risk category from which the unique information was located. With reference to fraud risk scores, a risk score for the fraud risk category may be based on changes in risk scores of the individuals on the scan list from one or more previous scans.

At block 240, the pre-breach system 130 analyzes the data breach risk scores, any generated data breach risk scores, and/or other data obtained or determined in view of scanning the data sources. In one embodiment, the pre-breach system 130 may provide the requesting entity with an indication of whether there is a potential or actual breach in the requesting entity's consumer information. For example, an overall data breach risk score may be calculated based on one or more calculated category risk scores and/or fraud risk scores for the consumers. Thus, in one embodiment an overall data breach risk score may be provided to the requesting entity as an indicator of a likelihood that information of the entities customers and/or employees has been compromised. In some embodiments, the pre-breach system 130 may provide an indication of likelihood that any located information regarding individuals on the scan list was leaked from the requesting entity or from another entity. Such a likelihood may be determined based on matching of information unique to the requesting entity and/or a quantity of individuals on the scan list for which information is located on a particular data source, possibly in a same area of the data source or even in a same order as on the scan list. In other embodiments, additional information may be provided to the requesting entity, such as the individual risk scores for various risk categories and/or indications of changes in risk scores over time.

At block 250, the pre-breach system 130 provides results from the analysis of to the requesting entity 110. In one embodiment, the pre-breach system 130 generates one or more reports for access by the requesting entity 110 detailing the consumer information that was assessed. In another embodiment, the requesting entity 110 may choose which risk categories to view on its detailed report. In some embodiments, the pre-breach system 130 provides the requesting entity 110 with charts comparing the selected data breach risk scores between two or more scanning periods.

FIG. 3 is a flowchart illustrating one embodiment of a method of periodically receiving and/or determining risk scores and providing a comparative analysis of pre-breach risk to a requesting entity 110. In an embodiment, the method shown in FIG. 3 may be performed substantially in realtime so that the requesting entity 110 is presented with detailed reports containing information related to improvement in actual or potential data breaches without substantial delay. Depending on the embodiment, the method may be performed with fewer or additional blocks than are illustrated in FIG. 3. In one embodiment, the method of FIG. 3 is performed by the pre-breach system 130. However, the method may be performed by one or more other suitable computing systems, such as a computing system that includes data scanning and data breach risk scoring modules that perform similar features to those discussed with reference to the pre-breach system 130. For ease of discussion, the methods discussed below will be described with reference to the pre-breach system 130. However, the methods may be performed by any other suitable computing system.

The method of FIG. 3 describes a process of analyzing fraud risk scores for individuals on a scan list of a requesting entity and comparing the fraud risk scores of such consumers with previous fraud risk scores in order to develop a data breach risk score for a fraud risk category. The method of FIG. 3 may also be used for providing risk scores associated with other risk categories, such as by comparing a quantity of individuals for which match criteria for a particular risk category are met in a current month with a quantity met in a previous month in order to generate a risk score for the particular category.

In one embodiment, the pre-breach system 130 receives the fraud risk scores and accesses previous fraud risk scores generated for the requesting entity 110. In some embodiments, the periodically generated fraud risk scores are compared. The fraud risk scores may be compared to determine a percentage change in fraud risk scores (or other data breach categories) in each of one or more fraud risk score ranges, for example. In other embodiments, the fraud risk scores may be compared and converted into a risk score, such as a risk score that indicates a current fraud risk (e.g., cumulative across all the consumers) and/or a risk score that indicates a change in fraud risk scores over times, such as a comparison of a previous aggregate fraud risk score (e.g., average of fraud risk scores of all individuals on the scan list) with a current aggregate fraud risk score. Thus, in one embodiment, a data breach risk score for a fraud risk category may be calculated based on the change in fraud risk scores. In one embodiment, fraud risk scores are generated at least partially manually, such as by an individual. In other embodiments, fraud risk scores are generated at least partially automatically by a computing device.

In block 300, the pre-breach system 130 receives the generated fraud risk scores, such as may be provided by a third-party fraud risk scoring system, such as Experian's Precise ID, or other similar fraud risk analysis systems. In one embodiment, the pre-breach system 130 generates fraud risk scores for consumers and/or generates aggregate fraud risk scores reflecting fraud risk across a requesting entity (or at least the individuals included in the scan list from the requesting entity).

In block 310, the pre-breach system 130 accesses previous fraud risk scores for the requesting entity 110. The previous fraud risk scores may be stored locally on the pre-breach system 130, may be entered by the requesting entity 110, or may be maintained/retrieved from other sources.

In block 320, the pre-breach system 130 compares the newly generated fraud risk scores with fraud risk scores previously generated for the individuals on the scan list. For example, individuals may be segmented into fraud risk ranges, such as a low, medium, and high fraud risk range, and totals of consumers within each of the segments may be calculated. Changes in the quantity of consumers in each of the fraud risk segments may then be determined on a periodic basis in order to detect changes over time in fraud risks associated with the individuals on the scan list.

In block 330, the pre-breach system 130 generates a data breach risk score based on the change in fraud risk scores over a period of time, such as comparison of quantities of consumers within respective fraud risk score segments compared to quantities of consumers within those same fraud risk score segments in one or more months. In some embodiments, this data breach risk score can be a percentage value, rating, or another indicator.

In block 340, the pre-breach system 130 periodically updates a data breach risk score for a fraud risk category based on a frequency setting that may be selected by the requesting entity. The risk score may be provided in the form of real-time notifications (e.g., in response to detecting a change in data breach risk scores for the requesting entity 110) and/or batch reports that are periodically provided to the requesting entity 110. In one embodiment, month to month changes in the data retrieved (and or derived) may be reported, as well as (or as an alternative to) a summary of the information located and/or the raw data located. For example, month-to-month changes in fraud risk scores (e.g., changes in numbers of fraud risk scores in particular ranges) may be reported.

In one embodiment, a requesting entity can ask for a determination of whether there has been a breach rather than signing up for a month-to-month (or other periodic) comparison. Once an actual breach has been determined, the requesting entity can request that the breach be tracked to a data source which holds its employee/customer information. The requesting entity can then follow up with that source to figure out how to resolve the issue.

As noted above, the method of FIG. 3 may be performed in a similar manner to determine data breach risk scores for other data breach risk categories. For example, comparison of quantities of consumers matching criteria for respective risk categories may be compared on a period-to-period basis to determine data breach risk scores.

Sample Data Breach Risk Setup and Reporting

Figure 4A:
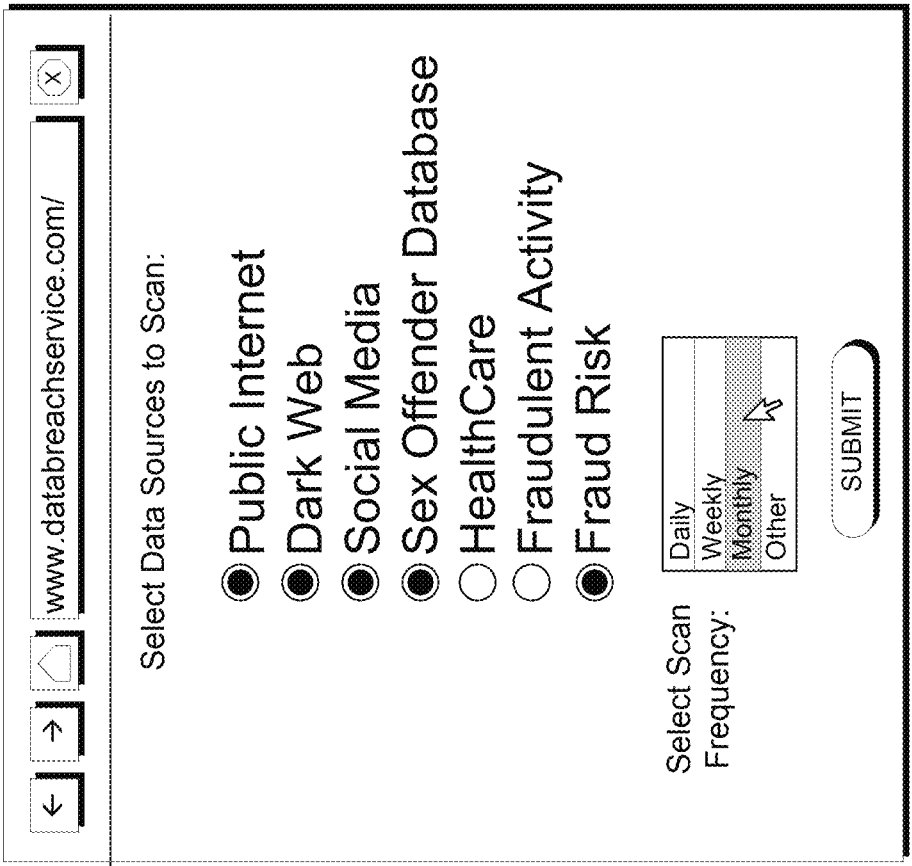
FIG. 4A illustrates an example user interface that allows a requesting entity to select data categories to include in a pre-breach scan, as well as a frequency of performing the scan.

FIG. 4A illustrates an example user interface that allows a requesting entity 110 to select which data breach risk categories to monitor. Depending on the embodiment, different risk categories may be provided in the user interface. In the embodiment of FIG. 4A, the requesting entity is given an option to select specific risk categories (which each may be associated with one or more data sources) to include in a proactive data breach scanning service. In this embodiment, the requesting entity can select any combination of the indicated risk categories. In other embodiments, other risk categories may be provided.

In some embodiments, the risk categories may be associated with separate costs, such as cost per consumer scanned within a particular risk category. For example, the public Internet risk category scan may cost $0.02 per consumer, while a dark web scan may cost $0.04 per consumer. Thus, the requesting entity may select the most appropriate risk categories in view of costs associated with performing the scan.

In one embodiment, the cost per consumer, and/or a total cost for a particular risk category (e.g., based on the actual number of consumers in the scan list and the cost per consumer for the respective risk category) may be provided on a user interface such as that shown in FIG. 4A, e.g., so that the requesting entity can gauge a cost associated with each data category.

FIG. 4A also includes a frequency selection tool that allows the requesting entity to set a frequency at which scanning of the selected risk categories is to occur. In one embodiment, different frequencies may be selected for particular risk categories (or event for particular data sources with a risk category), such that data sources of some risk categories may be scanned more frequently than others.

Figure 4B:
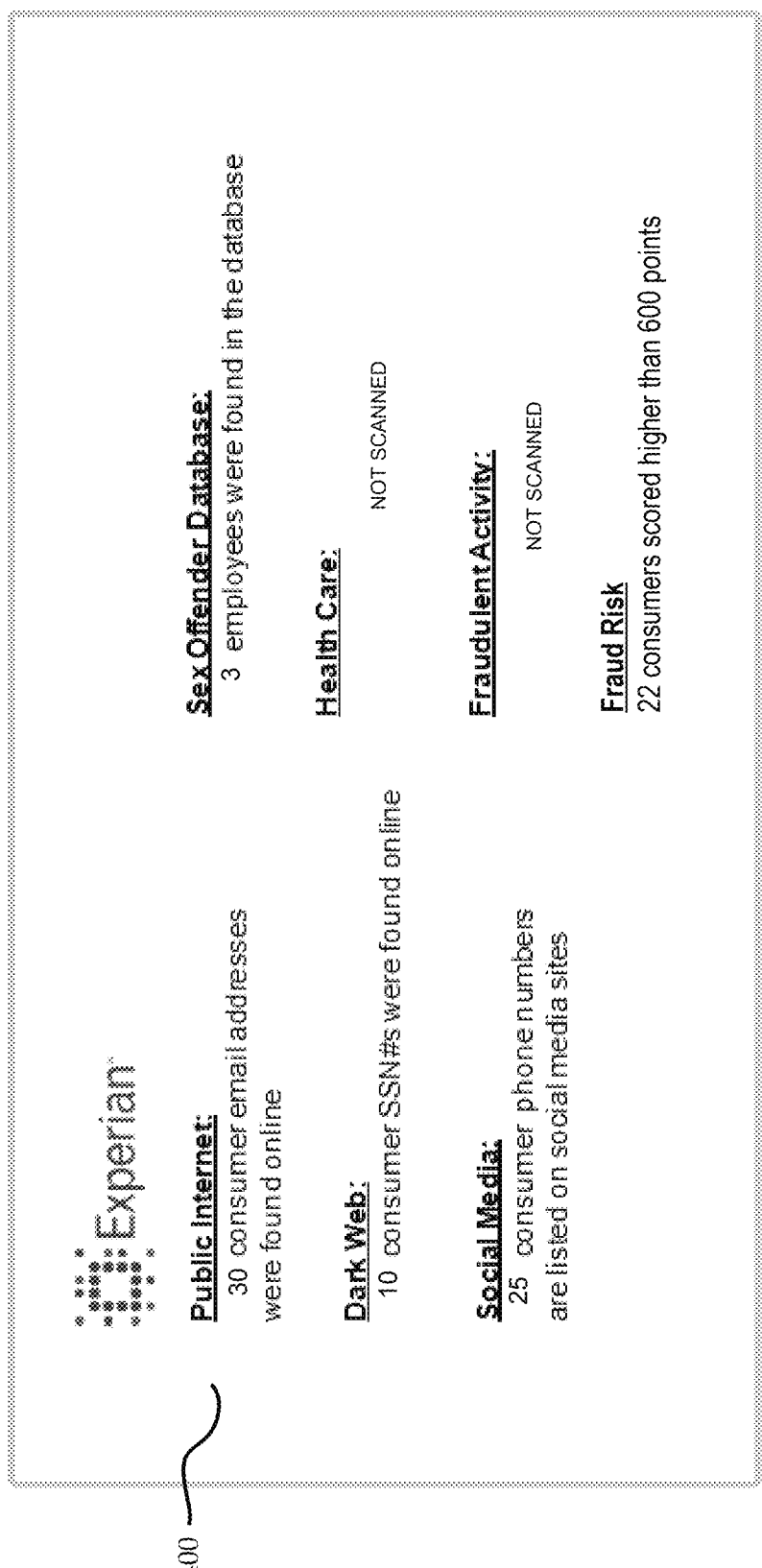
FIG. 4B illustrates an example user interface that provides the requesting entity with a summary of data breach scores for particular data breach categories.

FIG. 4B illustrates an example report 400 that may be provided to a requesting entity after a scan has been performed, either in an online user interface or in printed form. In this embodiment, the report includes information on each of the risk categories scanned, as well as an indication of additional available risk categories that were not scanned. In embodiment of FIG. 4B, the report indicates limited information regarding the consumer data that was located in each of the risk categories. For example, the report indicates that in public Internet risk category 30 consumer email addresses were found. In other embodiments, additional information regarding information of the consumers on the requesting entity's scan list may be provided. For example, the public Internet information may be selected (e.g., via a hyperlink) in order to access more detailed information regarding additional types of information located on the public Internet, where the information was located (e.g., specific Internet site/locations), what other information for the same individuals was located, how long information has been at those locations, etc. Similarly, more detailed information may be provided for each of the other risk categories.

In some embodiments, the report 500 includes data only in those risk categories that are scanned for the requesting entity, such as those risk categories that are selected using a user interface similar to FIG. 4A. Thus, if a particular requesting entity is not the healthcare space, that requesting entity can view a report that does not include information regarding the healthcare risk category.

Figure 5:
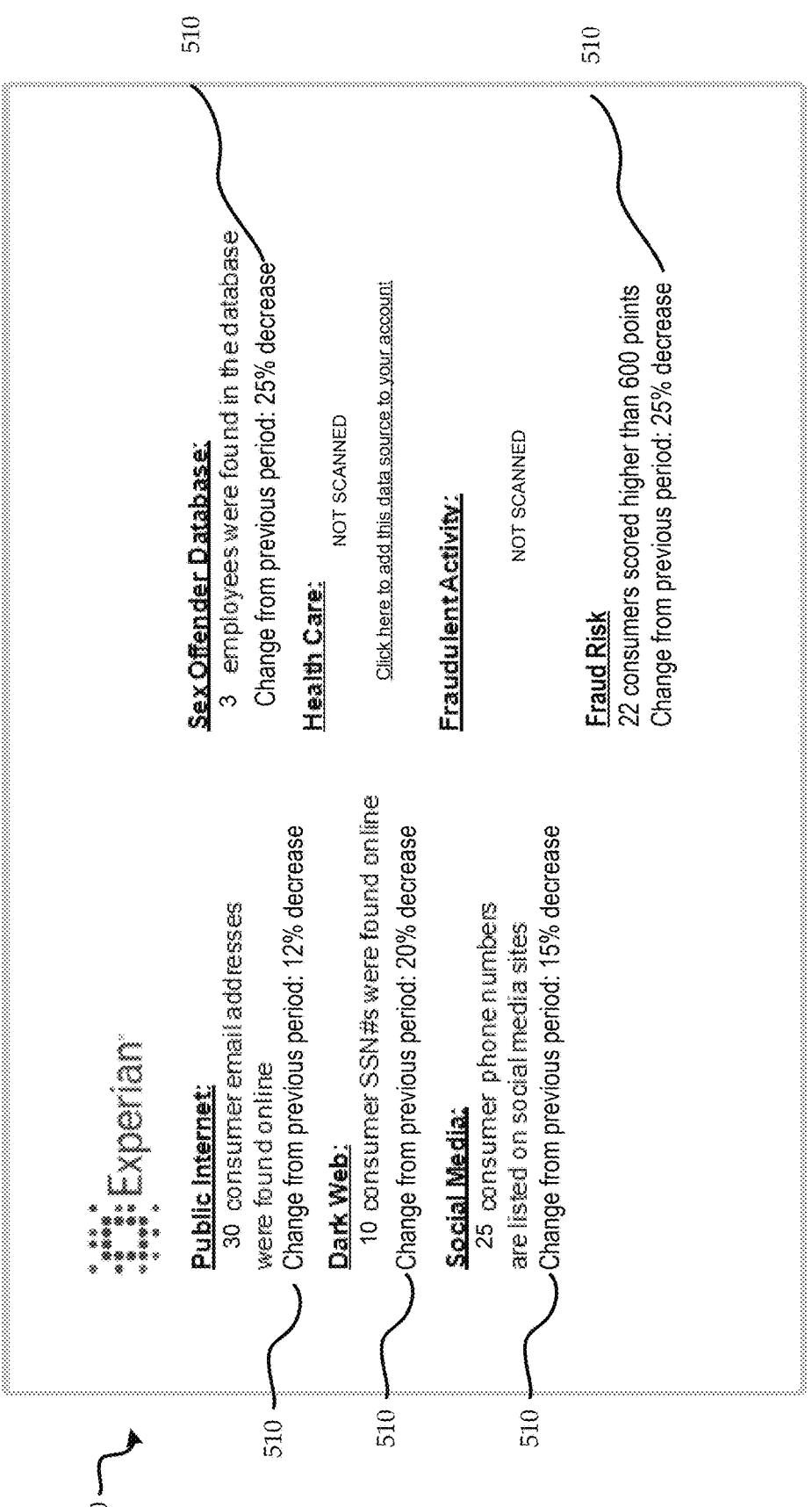
FIG. 5 illustrates an example user interface that provides the requesting entity with a summary of data breach scores for particular data breach categories, as well as a comparisons to data breach scores from a previous period.

FIG. 5 illustrates a report 500 that is similar to the report 400 of FIG. 4B, but with additional information regarding changes in located consumer information in each of the data breach categories. In particular, the example of FIG. 5 illustrates respective changes 510 of matching data points in a current period over matches located in a previous period for particular data breach risk categories. In this embodiment, the change indicators are presented in the form of percentages, but in other embodiments change information may be expressed in other manners, such as letters scores, or scores of other numerical ranges.

In other embodiments, the requesting entity 110 can customize how many previous periods or which specific periods it wishes the pre-breach system 130 to access. For example, a requesting entity can choose to view the change in its consumer information found through the public internet over a period of three month (e.g., rather than a default period of one month). In one embodiment, the user interface includes controls that allow the requesting entity to adjust the data shown to reflect less or additional data and/or to provide risk scores in different formats. Thus, the displayed data breach risk scores and/or reports may be customized by the requesting entity 110.

Figure 6:
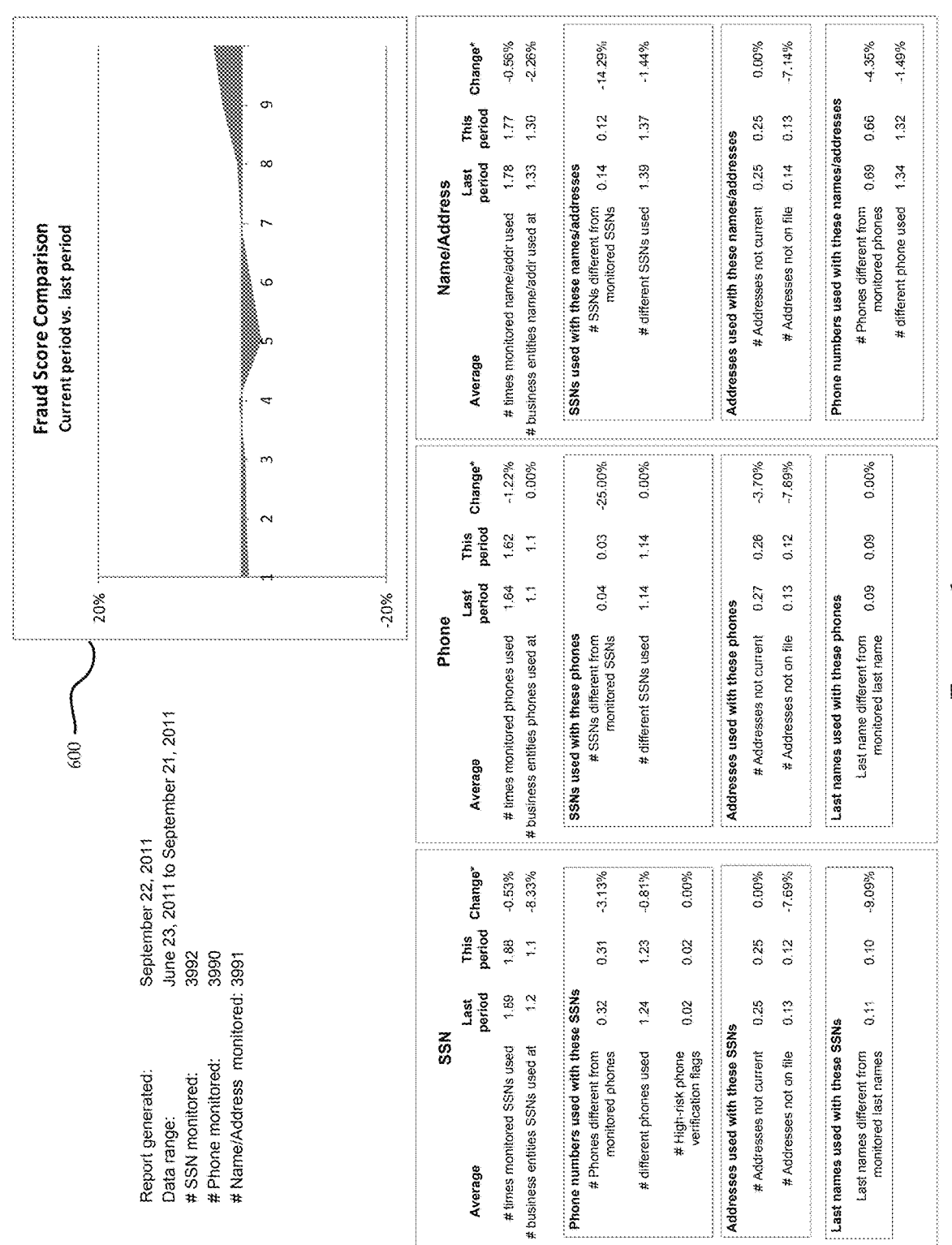
FIG. 6 illustrates detailed information regarding fraud scores of individuals associated with an entity and change in data items from a previous and current period.

FIG. 6 is a user interface that may be provided as a detailed report for a requesting entity 110 accessing its pre-data breach monitoring information. The user interface illustrated in FIG. 6 may be provided to the requesting entity 110 in response to selection of the Fraud Risk heading in a summary report, such as those of FIGS. 4B and 5. Alternatively, the user interface illustrated in FIG. 6 may be presented to the requesting entity in other manners.

In the embodiment of FIG. 6, data regarding various personal information types of consumers is indicated. In other embodiments, other information may be displayed. In FIG. 6, information regarding Social Security numbers, phone numbers, and names/addresses of consumers of individuals on the scan list is included in the user interface. The example information provides data points for a current period (e.g., "this period"), a previous period (e.g., "Last period), and a percentage change between the two periods. In this example report, information regarding social security numbers includes an average number of times each monitored social security number was used, as well as an average number of business entities at which those Social Security numbers were used. In the example data illustrated in FIG. 6, both the number of times monitored Social Security numbers were used, as well as the number of business entities at which Social Security numbers were used has decrease from the previous period, 0.53% and 8.33% respectively. Thus, this information may serve as a positive indication that any data breach means taken by the requesting entity are effective. In one embodiment, the requesting entity may obtain further information regarding information on the report, such as through one or more hyperlinks or other control means. For example, in one embodiment the requesting entity may be provided with a report listing the actual businesses at which Social Security numbers of the monitored individuals was located.

In the embodiment of FIG. 6, the Social Security number information also includes information regarding related information used with located monitored Social Security numbers. In particular, the user interface indicates a number of phone numbers different from monitored phone numbers of the corresponding monitored Social Security numbers. Thus, this data may provide an indication of Social Security numbers being used with other individuals (e.g., other phone numbers of fraudsters, for example). Similar comparisons of uses of other monitored consumer data in connection with monitored Social Security numbers is provided.

In FIG. 6, similar information to that illustrated in the Social Security number section is also provided with reference to phone number and name and address of monitored individuals. In other embodiments, other data items may be displayed in a similar manner.

In one embodiment, the results from the periodically generated fraud risk scores may be displayed on a chart 600 demonstrating the comparison of fraud risk scores in a current period compared to a previous period. In FIG. 6, the chart 600 displays a positive change in the fraud risk scores of individuals on a scan list from the requesting entity 110. In this particular chart, the vertical axis represents a percentage change in quantity of consumers with a particular fraud score, wherein fraud scores range from 1-10. Thus, the chart 600 indicates that compared to a previous period, in the current period there are about 4% less consumers that have a fraud score of 5 and about 5% more consumers that have a fraud score of 10. In this embodiment, higher fraud scores indicate decreased risk of fraud associated with the monitored individuals. In other embodiments, fraud risk scores that are higher may indicate an increased risk of fraud. In other embodiments, changes in fraud risk scores (and/or other data breach risk scores) may be illustrated in different manners.

In other embodiments, the chart 600 may show another data breach risk category which has been selected by the requesting entity 110. Depending on the embodiment, the information provided in the chart 600 may be customized, such as by the data sources 100 scanned or the data breach risk categories selected by the requesting entity 110.

The chart 600 allows the requesting entity 110 to easily determine its progress in data breach protection and monitoring over a period of time. By examining the detailed report and the chart 600 in FIG. 6, the requesting entity 110 is able to determine that measures it has taken to prevent or remedy data breaches over a period of time are successful.

Figure 7:
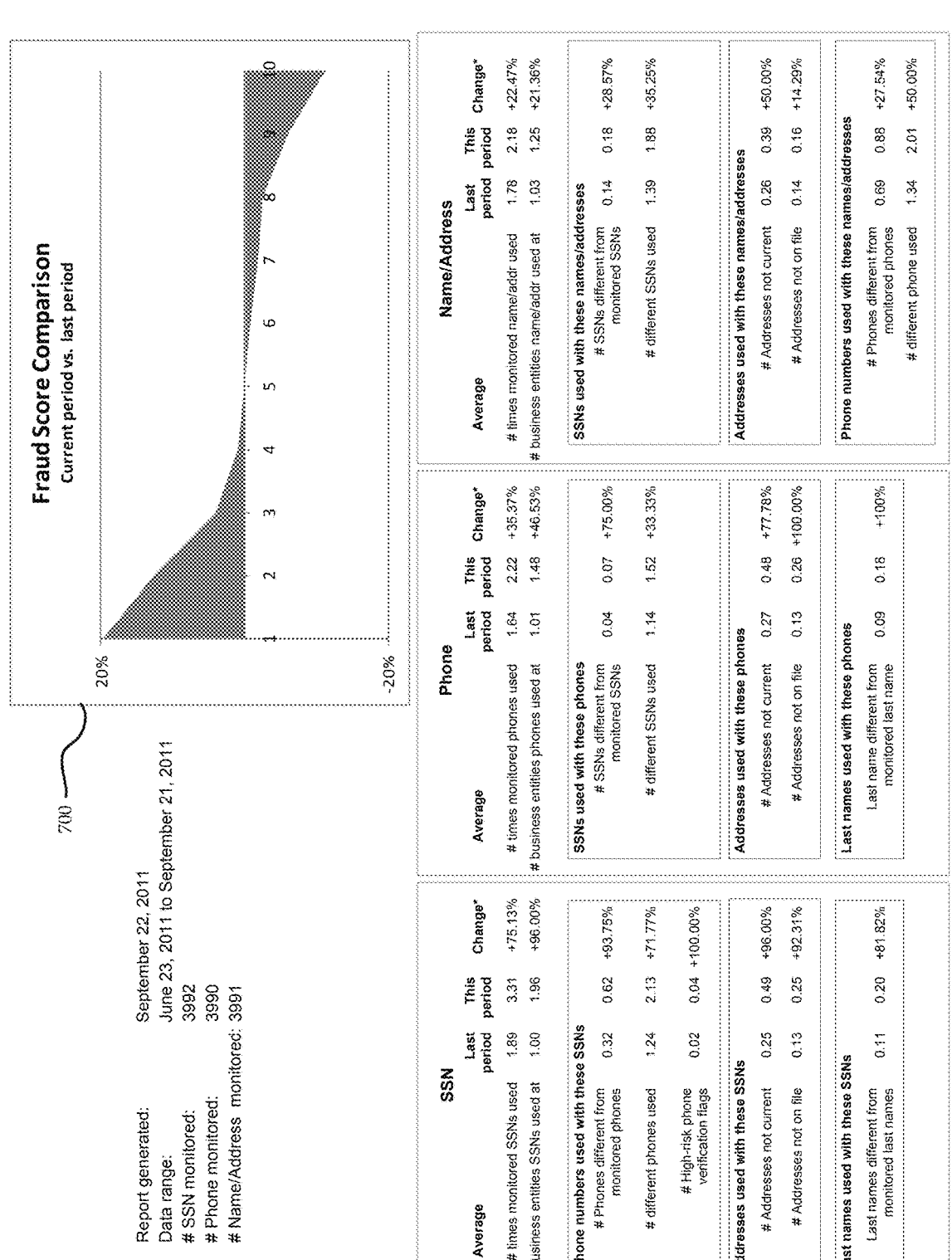
FIG. 7 illustrates detailed information regarding fraud scores of individuals associated with an entity and change in data items from a previous and current period.

FIG. 7 is a user interface that may be provided as a detailed report for a requesting entity 110 accessing its pre-data breach monitoring information. Similar to FIG. 6, the consumer information accessed and scanned by the pre-breach system 130 included social security numbers, phone numbers, names, and addresses of the requesting entity's 100 consumers.

Similar to chart 600 (FIG. 6), chart 700 illustrates comparison of data breach risk scores between a current period and previous period. In FIG. 7, the chart 700 displays a negative change in the data breach risk score of the requesting entity 110. For example, the chart 700 indicates that there is about 19% more consumers that have a fraud score of one than in a previous period, while there are about 10% fewer consumers with a fraud score of 10 than in a previous period. In this embodiment, lower fraud scores indicate an increased risk of fraud associated with the consumers. In addition, different score ranges may be used in other embodiments, such as a range from 1-999, such as is illustrated in FIG. 8, for example.

The chart 700 allows the requesting entity 110 to determine its progress in data breach protection and monitoring over a period of time. By examining the detailed report and the chart 700 in FIG. 7, the requesting entity 110 may be able to determine that measures it has taken to prevent or remedy data breaches over a period of time have not been successful. The requesting entity 110 may also be able to determine that further measures need to be taken to improve its data breach risk scores and/or preventative measures taken to protect its data.

Figure 8:
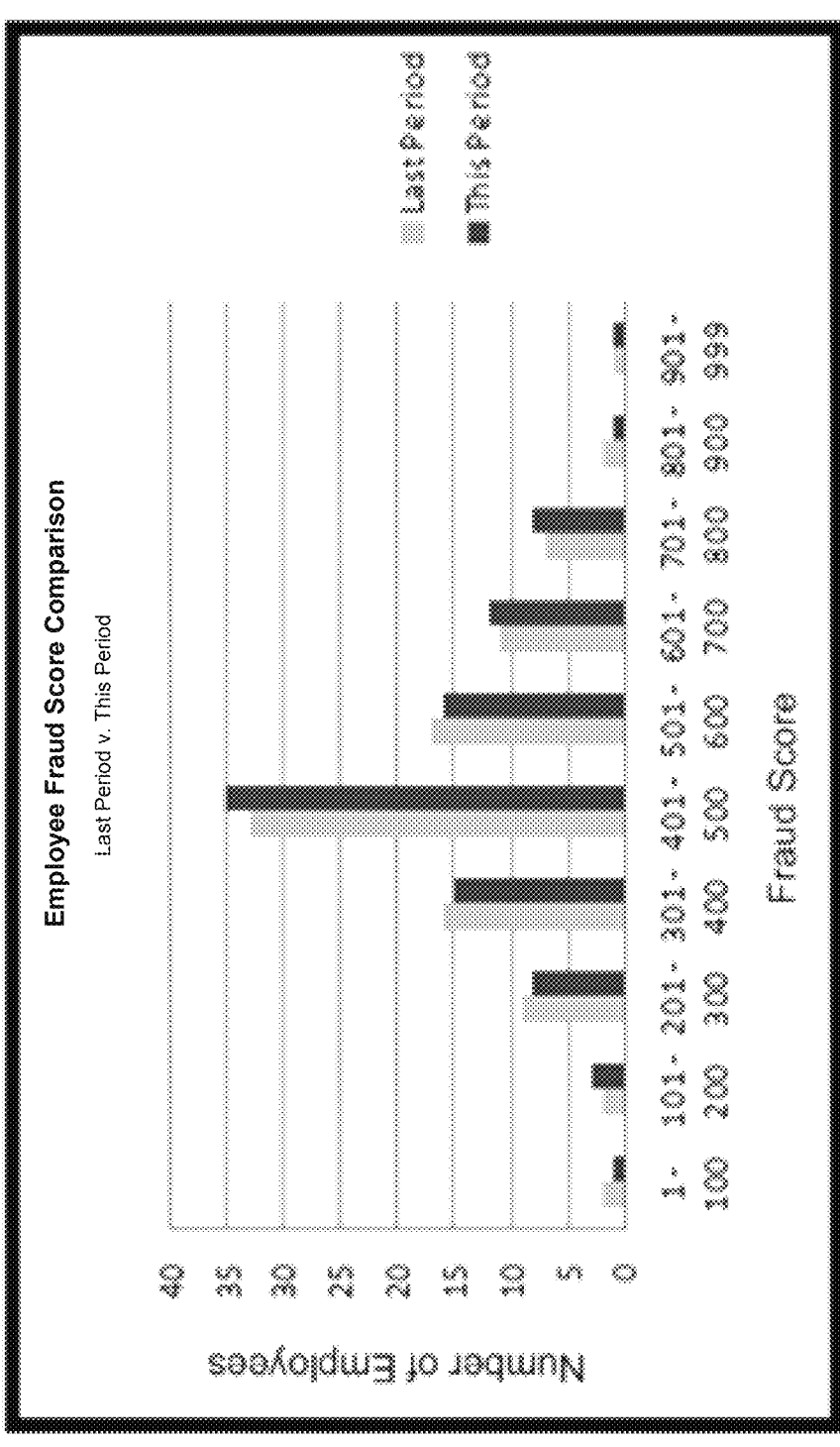
FIG. 8 illustrates an example chart comparing employee fraud scores in a previous period and a current period.

FIG. 8 illustrates a chart displaying the data breach risk scores comparing fraud risk scores for a scan list of employees. In this embodiment, the risk scores received for respective employees (e.g. from a third-party fraud scoring system) are segmented into groups each covering a range of 100. In the example of FIG. 8, the segment with the most employees is fraud scores from 401-500, with similar numbers of employees in fraud score ranges 301-400 and 501-600. Importantly, the chart of FIG. 8 illustrates changes in the quantities of employees within each of the segments from a previous period (e.g. a previous month or quarter when fraud scores were last obtained for the employees or a previous scan selected by the requesting entity). In the particular example of FIG. 8, the number of employees with fraud scores in the 401-500 range is increased in the current period, but the number of employees within fraud score ranges 501-600 and 801-900 has decreased in the current period. Depending on the embodiment, the pre-breach system 130 may generate one or more scores based on the comparison of previous and current period results. Additionally, more historical data may be provided, such as two or more previous periods being illustrated on the chart of FIG. 8.

Other types of graphics illustrating historical comparisons of fraud scores (and/or other data breach risk scores as discussed herein) may be provided also, such as a historical graph illustrating quantity of consumers within a 701-999 segment of fraud scores over a period of one year.

Figures 9A, 9B, 9C, 9D:
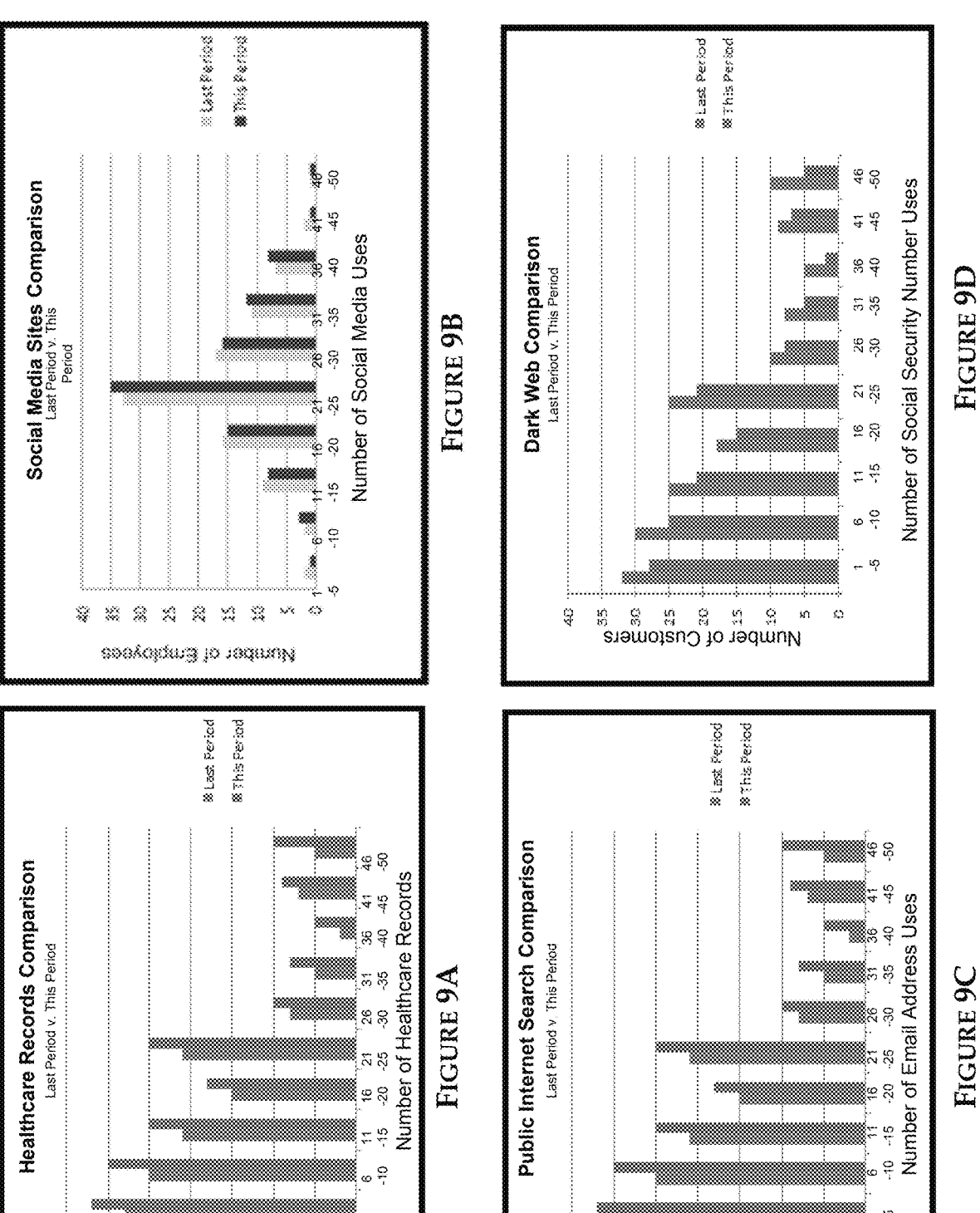
FIGS. 9A-9D are illustrative example charts comparing data associated with various data breach risk categories for two periods.

FIG. 9A-D illustrate different data breach risk category comparisons. In FIG. 9A, the chart displays the number of customers who have healthcare records available within the scanned data sources 100. This chart shows an increase in the number of customers who have healthcare records available in data sources, which demonstrates that the requesting entity 110 has either not taken measures to fix an actual data breach or the measures it has taken are not successful in preventing a breach. As shown in FIG. 9A, the number of customers having from 1-5 healthcare records identified in one or more healthcare data sources scanned by the pre-breach system has increased from 28 in the previous period to 32 in the current period. Similarly, the number of customers having 6-10 healthcare records identified increased from 25 in the previous period 230 in the current period.

In FIG. 9B, the chart displays the number of customers who have identifying information available through social media sites within the scanned data sources 100. This chart shows an increase in the number of customers who have social media data points available in data sources 100, which demonstrates that the requesting entity 110 has either not taken measures to fix an actual data breach or the measures it has taken are not successful in preventing a breach.

Depending on the embodiment, the number of social media uses may include uses of only certain types of consumer data and/or combinations of consumer data. For example, use of a consumer's name only may not be counted as a social media use in one embodiment, while use of a consumer's name and home address (or email address, phone number, and/or other items) may be counted as a social media use. Depending on the embodiment, the requesting entity may define rules for classifying data associated with customers/employees as hits that are to be included in the reporting analysis. Thus, a first requesting entity may determine that uses of only a consumer's first and last name should be counted in social media uses, while another requesting entity may determine that uses of only a consumer's first and last name should not be counted as social media uses.

In FIG. 9C, the chart displays the number of customers who have identifying information available through the public internet within the scanned data sources 100. This chart shows an increase in the number of customers who have public internet search data points available in data sources 100, which demonstrates that the requesting entity 110 has either not taken measures to fix an actual data breach or the measures it has taken are not successful in preventing a breach.

In FIG. 9D, the chart displays the number of consumer social security number uses found within the data breach category of the Dark Web. This chart shows an increase in the number of customers who have Dark Web data points available in data sources 100, which demonstrates that the requesting entity 110 has either not taken measures to fix an actual data breach or the measures it has taken are not successful in preventing a breach.

As noted above with reference to FIG. 9B, the criteria for counting location of consumer information in one or more of the data breach risk categories may be customized by a requesting entity and/or the pre-breach system.

Badges

Figure 10:
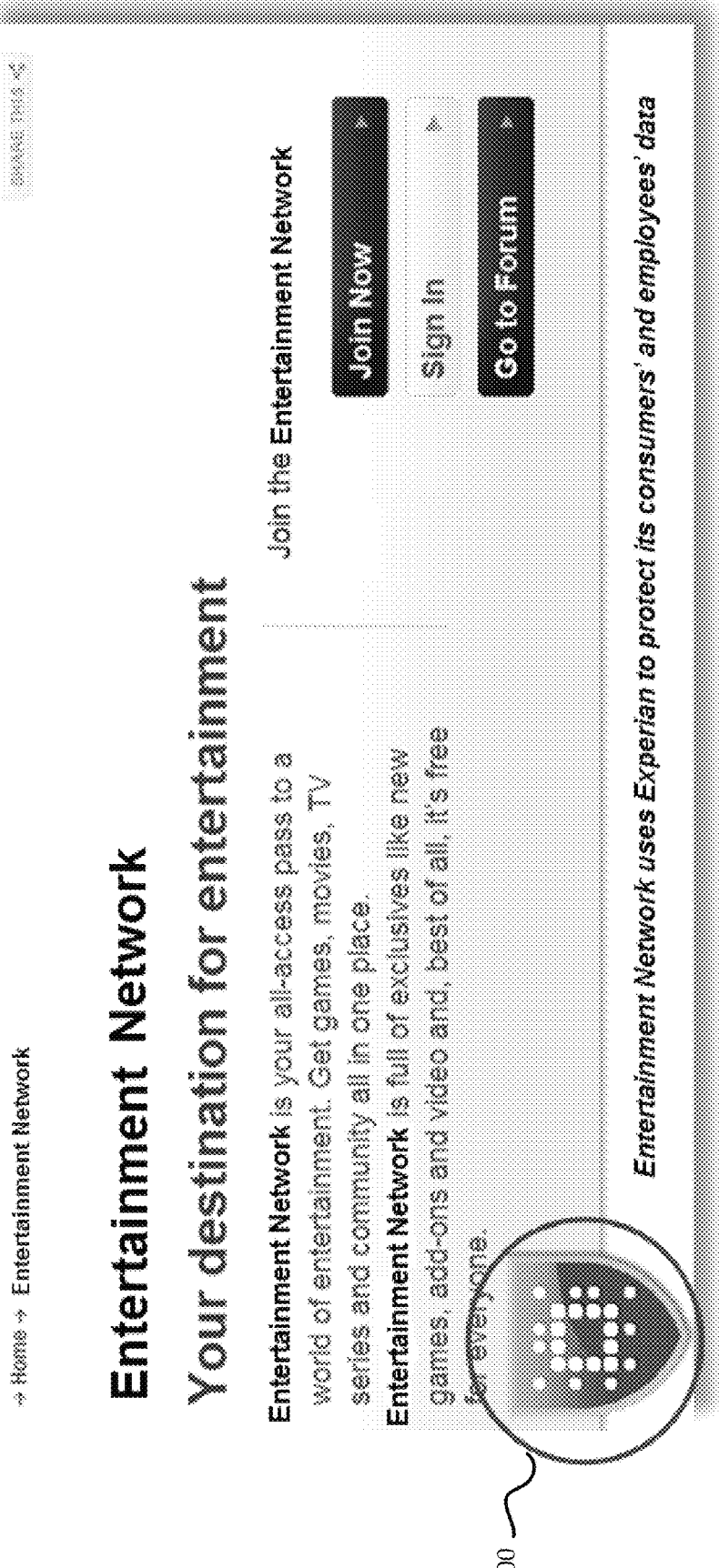
FIG. 10 illustrates an example fraud score badge placed on a requesting entity's webpage.

FIG. 10 illustrates a webpage of a requesting entity 110 that has requested and completed data breach monitoring through the pre-breach system 130. In some embodiments, once data breach risk score(s) of the requesting entity 110 are determined, it may be awarded a badge 600 corresponding to its level of active measures taken to remedy or prevent data breaches. In some embodiments, information provided by the requesting entity to a provider of the pre-breach system may be manually analyzed in order to determine if the requesting entity should be provided with a badge. For example, remediation information (e.g., steps take to resolve issues with consumer data that may have been leaked from the requesting entity) may be provided to the provider of the pre-breach system for manual (or automatic) review in determine whether a badge should be provided to the requesting entity (and possible particular badge that should be provided)

The badge 600 may also be awarded based on the change in one or more risk scores and/or overall risk scores. For example, a bronze badge may represent that the requesting entity 110 has a 5% decrease in its consumer information available within data sources 100, while a silver badge represents a 10% decrease and a gold badge represents a 20% or higher decrease. Thus, a badge may be placed on a requesting entity's website and/or other marketing materials, in order to signify that the requesting entity is taking appropriate care in monitoring for potential breaches of its customers and/or employees personal data.

In one embodiment, determining whether a badge should be provided to a requesting entity, or which badge should be provided, may be based on a comparison of risk scores of the requesting entity to risk scores of other entities, such as entities within the same or similar vertical market, having a similar number of employees, within a similar geographic region, or the like. For example, a relatively high public internet risk score for a particular requesting entity may not have a negative impact on the determination of a badge to provide to the requesting entity if the risk score is much lower than public internet risk scores for other entities within the same vertical market. Similarly, a low overall risk score for an entity (e.g., based on multiple category risk scores) may weigh against award of a badge if that low overall risk score is higher than overall risk scores for similar types of companies (e.g., similar vertical market).

Badges may encourage additional engagement by customers in view of a perceived sense of security provided by the requesting entity proactively monitoring for potential data breaches that is expressed by be badges. In some embodiments, qualifications for having a badge on a requesting entity's website may need to be periodically confirmed, such as in response to a monthly or quarterly scanning of data sources against the requesting entity's customer list and/or providing information to the provider of the pre-breach system regarding steps taken to reduce data breaches.

In one embodiment, the badge icon is obtained via a hyperlink to the data breach entity, which provides the appropriate badge for placement on the webpage when accessed by a consumer in view of most recent data breach risk scores (e.g. in comparison with previous data breach risk scores of the requesting entity). Thus, in this embodiment the level of actions taken by the requesting entity in detecting and remediating data breaches may be updated automatically and up-to-date badges may be provided in order to further encourage consumers to interface with the requesting entity. In some embodiments, badges may be entirely revoked/removed when there has been a failure to continue taking appropriate measures to prevent or remedy data breaches. The awarding of a badge may be determined manually in part or automatically by a computing system.

FIG. 11 illustrates one embodiment of a pre-breach system 130 that is configured to provide information to businesses on potential risks of data breaches, even prior to a full-blown data breach. In the embodiment of FIG. 11, the pre-breach system 130 includes a data scanning module 165 that is configured to query one or more data providers, either local data providers or remote data providers, in order to identify consumer information of a business that has requested pre-breach processing. As shown in FIG. 11, a requesting entity 110 stores, either locally or remotely, information of customers (in customer data store 105) and/or information of employees (in employee data store 115). Such information may be susceptible to data breaches. However, until a data breach has occurred, the requesting entity 110 may have no idea how likely it is that its customers and/or employees information may be fraudulently accessed.

The pre-breach system of FIG. 11 includes three modules that are configured to provide early breach notifications to businesses. First, a data scanning module 165 is configured to receive data from and/or otherwise scan data sources for information regarding customers of the requesting entity 110 in order to identify indications of potential data breaches of the business' data. In one embodiment, the business provides the data scanning module 165 with information regarding customers so that the data scanning module 165 can identify potential misuses of those customers information. Consumer information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. The data scanning module 165 may then scan multiple data sources, including public and/or private data sources, to identify possible leaks of the consumer information that is indicative of an actual or potential data breach. Scanning may be performed on employee data in a similar manner.

The data breach risk score module 150 is configured to generate data breach risk scores for customers of the requesting entity 110, such as based on information provided by the requesting entity 110 regarding customers (and/or employees) and/or additional information (e.g., credit data) obtained regarding those individuals. In one embodiment, fraud risk scores (which may be used in generation of a data breach risk score for a fraud category) are provided by Experian's Precise ID product and/or are similar to those data breach risk scores.

The report generation module 145 analyzes the data of the data scanning module 165 and/or the data breach risk score module 150 and generates one or more reports to the requesting entity 110. Reports may be in the form of real-time notifications (e.g., in response to detecting a change in data breach risk for the requesting entity 110) and/or batch reports that are periodically provided to the requesting entity 110. In one embodiment, month to month changes in the data retrieved (and or derived) may be reported, as well as (or as an alternative to) a summary of the information located and/or the raw data located. For example, month-to-month changes in data breach risk scores (e.g., changes in numbers of data breach risk scores in particular ranges) may be reported.

Example Computing System

The pre-breach system 130 includes, for example, a personal computer that is IBM, Macintosh, or Linux/Unix compatible or a server or workstation. In one embodiment, the pre-breach system 130 comprises a server, a laptop computer, a cell phone, a personal digital assistant, a kiosk, or an audio player, for example. In one embodiment, the exemplary pre-breach system 130 includes one or more central processing unit ("CPU") 155, which may each include a conventional or proprietary microprocessor.

The pre-breach system 130 further includes one or more mass storage devices 135, such as a hard drive, diskette, solid state drive, or optical media storage device. Typically, the modules of the pre-breach system 130 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the locator system 100 may be combined into fewer components and modules or further separated into additional components and modules.

The pre-breach system 130 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the pre-breach system 130 may be controlled by a proprietary operating system. Conventional operating systems control and schedule computer processes for execution, perform memory management, provide file system, networking, I/O services, and provide a user interface, such as a graphical user interface ("GUI"), among other things.

The pre-breach system 130 may include one or more commonly available input/output (I/O) devices and interfaces 160, such as a keyboard, mouse, touchpad, and printer. In one embodiment, the I/O devices and interfaces 160 include one or more display devices, such as a monitor, that allows the visual presentation of data to a user. More particularly, a display device provides for the presentation of GUIs, application software data, and multimedia presentations, for example. The pre-breach system 130 may also include one or more multimedia devices 140, such as speakers, video cards, graphics accelerators, and microphones, for example.

In the embodiment of FIG. 11, the I/O devices and interfaces 160 provide a communication interface to various external devices. In the embodiment of FIG. 11, the pre-breach system 130 is electronically coupled to a network 120, which comprises one or more of a LAN, WAN, and/or the Internet, for example, via a wired, wireless, or combination of wired and wireless, communication link. The network 120 communicates with various computing devices and/or other electronic devices via wired or wireless communication links.

According to FIG. 11, information is provided to the pre-breach system 130 over the network 120 from one or more data sources 100. The data sources 100 may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 11, the pre-breach system 130 also includes modules 145, 150, and 165 that may be stored in the mass storage device 135 as executable software codes that are executed by the CPU 155. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 11, the pre-breach system 130 is configured to execute the modules 145, 150, and 165 in order to monitor online data to predict or determine a risk of data breach, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the pre-breach system 130, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

What is claimed is:

1. A computer-implemented method comprising:
retrieving information identifying each of a plurality of individuals associated with an entity;
scanning a plurality of data sources for information regarding the plurality of individuals associated with the entity, wherein the plurality of data sources that are scanned include one or more dark web data sources that are accessible via particular browsing software, wherein automatically scanning the one or more dark web data sources comprises:
executing a particular browser that is configured to access dark address space that is not accessible via a standard browser configured to access public internet data sources; and
scanning at least a subset of the dark address space accessed via execution of the particular browser for at least a portion of data regarding the plurality of individuals;
generating a score for at least one of (a) a particular individual of the plurality of individuals or (b) the entity associated with the plurality of individuals, wherein the score is generated based at least in part on each of two or more categories of information found during the scanning of the plurality of data sources; and
based at least in part on the score, providing a notification to at least one of (i) the particular individual or (ii) the entity associated with the plurality of individuals, wherein the notification includes an indication of whether at least one of the scanning or the score suggests a likelihood that personal information has been compromised.

2. The computer-implemented method of claim 1, wherein the plurality of individuals are associated with a company, wherein the entity is the company.

3. The computer-implemented method of claim 2, wherein the method further comprises:
periodically automatically scanning the plurality of data sources with respect to other individuals associated with each of a plurality of other entities, wherein the plurality of other entities are similar to the entity in one or more categories; and comparing the score for the entity to scores determined for the plurality of other entities.

4. The computer-implemented method of claim 1, wherein the plurality of data sources further comprise public internet data sources.

5. The computer-implemented method of claim 1, wherein the score is based at least in part on a difference in quantity of information found in the scanning relative to a prior quantity of information found in a prior scan.

6. The computer-implemented method of claim 1, wherein the notification comprises an indication of a change in the score over time.

7. The computer-implemented method of claim 1, further comprising determining a quantity of located data via the scanning for each of a plurality of data breach risk categories.

8. The computer-implemented method of claim 1, wherein the two or more categories of information include at least three of: public internet, dark web, social media sites, sex offender databases, heath care, or fraudulent activity sites.

9. The computer-implemented method of claim 1, further comprising tracking a potential data breach to a particular data source holding a portion of data associated with one or more of the plurality of individuals.

10. The computer-implemented method of claim 1, further comprising tracking a potential data breach over time, and in response to determining that a change to the score exceeds a threshold, generate another notification indicative of the change.

11. The computer-implemented method of claim 1, wherein generating the score comprises applying weights to different categories of information.

12. A computing system comprising:
memory; and
a hardware processor configured to execute computer-executable instructions to:
retrieve information identifying each of a plurality of individuals associated with an entity;
scan a plurality of data sources for information regarding the plurality of individuals associated with the entity, wherein the plurality of data sources that are scanned include one or more dark web data sources that are accessible via particular browsing software, wherein automatically scanning the one or more dark web data sources comprises:
executing a particular browser that is configured to access dark address space that is not accessible via a standard browser configured to access public internet data sources; and
scanning at least a subset of the dark address space accessed via execution of the particular browser for at least a portion of data regarding the plurality of individuals;
generate a score for at least one of (a) a particular individual of the plurality of individuals or (b) the entity associated with the plurality of individuals, wherein the score is generated based at least in part on each of two or more categories of information found during the scanning of the plurality of data sources; and
based at least in part on the score, provide a notification to at least one of (i) the particular individual or (ii) the entity associated with the plurality of individuals, wherein the notification includes an indication of whether at least one of the scanning or the score suggests a likelihood that personal information has been compromised.

13. The computing system of claim 12, wherein generating the score comprises determining a plurality of scores that are each associated with a different data breach risk category of a plurality of data breach risk categories.

14. The computing system of claim 13, wherein a first of the plurality of data breach risk categories is associated with the public internet data sources, and wherein a second of the plurality of data breach risk categories is associated with the dark web data sources.

15. The computing system of claim 14, wherein a third of the plurality of data breach risk categories is associated with social media sources.

16. The computing system of claim 13, wherein the score is an average of the plurality of data breach category risk scores.

17. The computing system of claim 13, wherein a first of the plurality of data breach risk categories is weighted more heavily in determining the score than a second of the plurality of data breach risk categories.

18. A non-transitory computer-readable medium storing computer executable instructions that, when executed by one or more computer systems, configure the one or more computer systems to perform operations comprising:
retrieving information identifying each of a plurality of individuals associated with an entity;
scanning a plurality of data sources for information regarding the plurality of individuals associated with the entity, wherein the plurality of data sources that are scanned include one or more dark web data sources that are accessible via particular browsing software, wherein automatically scanning the one or more dark web data sources comprises:
executing a particular browser that is configured to access dark address space that is not accessible via a standard browser configured to access public internet data sources; and
scanning at least a subset of the dark address space accessed via execution of the particular browser for at least a portion of data regarding the plurality of individuals;
generating a score for at least one of (a) a particular individual of the plurality of individuals or (b) the entity associated with the plurality of individuals, wherein the score is generated based at least in part on each of two or more categories of information found during the scanning of the plurality of data sources; and
based at least in part on the score, providing a notification to at least one of (i) the particular individual or (ii) the entity associated with the plurality of individuals, wherein the notification includes an indication of whether at least one of the scanning or the score suggests a likelihood that personal information has been compromised.

19. The non-transitory computer-readable medium of claim 18, wherein the operations further comprise:
providing the entity with an option to present a badge on a webpage provided by the entity, the badge indicating that the entity has taken measures to reduce risks of data breach in association with the automatically scanning of the plurality of data sources.

20. The non-transitory computer-readable medium of claim 18, wherein generating the score comprises determining a plurality of category risk scores that are each associated with a different category of information.

* * * * *